(12) United States Patent
Kontu et al.

(10) Patent No.: US 11,253,897 B2
(45) Date of Patent: Feb. 22, 2022

(54) METHOD AND DEVICE FOR MANUFACTURING PLATE PARTS FOR A HEAT EXCHANGER

(71) Applicant: VAHTERUS OY, Kalanti (FI)

(72) Inventors: Mauri Kontu, Kalanti as. (FI); Paavo Pitkänen, Uusikaupunki (FI)

(73) Assignee: VAHTERUS OY, Kalanti (FI)

( * ) Notice: Subject to any disclaimer, the term of this patent is extended or adjusted under 35 U.S.C. 154(b) by 352 days.

(21) Appl. No.: 15/566,756

(22) PCT Filed: Apr. 11, 2016

(86) PCT No.: PCT/FI2016/050232
§ 371 (c)(1),
(2) Date: Oct. 16, 2017

(87) PCT Pub. No.: WO2016/166411
PCT Pub. Date: Oct. 20, 2016

(65) Prior Publication Data
US 2018/0093311 A1     Apr. 5, 2018

(30) Foreign Application Priority Data

Apr. 17, 2015 (FI) .................................. 20155287

(51) Int. Cl.
*B21D 13/04*   (2006.01)
*B21D 22/08*   (2006.01)
(Continued)

(52) U.S. Cl.
CPC ............. *B21D 13/04* (2013.01); *B21D 22/08* (2013.01); *B21D 28/36* (2013.01); *B21H 8/005* (2013.01); *B23K 26/38* (2013.01)

(58) Field of Classification Search
CPC . B21B 1/227; B21B 2203/02; B21B 15/0007; B21H 8/00; B21H 8/005; B44B 5/0009; B44B 5/0047; B21D 13/04
See application file for complete search history.

(56) References Cited

U.S. PATENT DOCUMENTS

| 3,512,477 A | 5/1970 | Nelson |
| 4,112,722 A | 9/1978 | Boucard |

(Continued)

FOREIGN PATENT DOCUMENTS

| CN | 2464540 | 12/2001 |
| CN | 101372158 | 2/2009 |

(Continued)

OTHER PUBLICATIONS

Second Office Action and Search Report, CN Application No. 201680022387.8 (dated May 5, 2019).

(Continued)

*Primary Examiner* — Adam J Eiseman
*Assistant Examiner* — Amer Islam
(74) *Attorney, Agent, or Firm* — Nixon & Vanderhye P.C.

(57) ABSTRACT

The present invention relates to a method and a device for manufacturing plate part blanks for a heat exchanger. A sheet material (2) in the form of continuous sheeting is worked between two rolls (5, 6) with opposite surface patterns (7, 7', 8) to form profiled plate part blanks (3, 3',3") into the sheet material (2) so that the rolls (5, 6) are synchronized to rotate at substantially same rate by controlling the rotation of them in relation to each other with common synchronization gear (9), which gear is coupled to the rolls (5, 6) by means of shafts (10, 11) with disk pack or gear couplings.

7 Claims, 2 Drawing Sheets

(51) Int. Cl.
B21D 28/36 (2006.01)
B21H 8/00 (2006.01)
B23K 26/38 (2014.01)

(56) References Cited

U.S. PATENT DOCUMENTS

| | | | | |
|---|---|---|---|---|
| 8,661,670 | B2* | 3/2014 | Bruck | B01J 35/04 |
| | | | | 29/430 |
| 9,579,702 | B2* | 2/2017 | Yowell | B21D 13/04 |
| 9,908,168 | B2* | 3/2018 | Pohl | B21D 35/001 |
| 2001/0008719 | A1 | 7/2001 | Ikeda | |
| 2002/0112519 | A1* | 8/2002 | Bisaillon | B21D 15/02 |
| | | | | 72/105 |
| 2005/0061049 | A1* | 3/2005 | Durney | B21D 5/00 |
| | | | | 72/324 |
| 2013/0291375 | A1* | 11/2013 | Virtanen | G06K 19/07754 |
| | | | | 29/601 |
| 2016/0304386 | A1 | 10/2016 | Dong et al. | |

FOREIGN PATENT DOCUMENTS

| | | |
|---|---|---|
| CN | 101817120 | 9/2010 |
| CN | 201596852 | 10/2010 |
| CN | 102179435 | 9/2011 |
| CN | 102189333 | 9/2011 |
| CN | 102639280 | 8/2012 |
| CN | 202606606 | 12/2012 |
| CN | 202878047 | 4/2013 |
| CN | 202971793 | 6/2013 |
| CN | 103282192 | 9/2013 |
| CN | 103831539 | 6/2014 |
| DE | 2 116 103 | 10/1972 |
| DE | 2 362 711 | 6/1975 |
| EP | 2 027 994 | 2/2009 |
| EP | 2 674 238 | 12/2013 |
| JP | 9-66335 | 3/1997 |
| JP | 2005-513642 | 5/2005 |
| WO | WO2000053355 A1 * | 3/2000 ............ B21D 22/08 |
| WO | WO 00/53355 | 9/2000 |
| WO | WO 03/054646 | 7/2003 |

OTHER PUBLICATIONS

International Search Report for PCT/FI2016/050232, dated Jul. 1, 2016, 5 pages.
Written Opinion of the ISA for PCT/FI2016/050232, dated Jul. 1, 2016, 6 pages.
International Preliminary Report on Patentability w/Amended Claims for PCT/FI2016/050232, dated Jun. 29, 2017, 15 pages.
FI Search Report for FI20155287 dated Dec. 16, 2015, 2 pages.
Search Report, CN Application No. 201680022387.8 (dated Sep. 3, 2018).
*Two-roll Reversible Blooming Mill,* compiled by Zhou Lin, China Long Products Rolling Technology and Equipment [M]., Beijing: Metallurgical Industry Press, pp. 275-276, Jun. 30, 2014 (English translation).
*Treatment of Decorations on Aluminum Surfaces,* by Xie Baozhong, et al., Data Plate Design, Manufacturing and Adhesion [M]., Chengdu: Sichuan Science and Technology Press, pp. 259-261, Feb. 28, 1984 (English translation).
CN Office Action for CN Application No. 201680022387.8 dated Sep. 29, 2021 (with English-Language Translation).
Detailed Explanation of Application Cases of Mechatronics System (Shu, Zhi-bing, China Electric Power Press, pp. 129-134, Aug. 2011, 4.8 Application of Weihong Numerical Control System in CCD Vision Aided Positioning Machine Tool).

* cited by examiner

METHOD AND DEVICE FOR MANUFACTURING PLATE PARTS FOR A HEAT EXCHANGER

This application is the U.S. national phase of International Application No. PCT/FI2016/050232 filed 11 Apr. 2016 which designated the U.S. and claims priority to FI Patent Application No. 20155287 filed 17 Apr. 2015, the entire contents of each of which are hereby incorporated by reference.

FIELD OF THE INVENTION

The present invention relates to a method and a device for manufacturing plate part blanks according to the preambles of the independent claims presented below. The present invention also relates to an arrangement for manufacturing plate parts for a heat exchanger.

BACKGROUND OF THE INVENTION

The plate pack of the plate heat exchangers is usually composed of profiled metal plates. The profile pattern of the plates, i.e. the profile shape and the height of the profile, can vary depending on the desired heat exchange properties. Typically the profiled plates of plate heat exchangers are manufactured by the cold working method by pressing one plate at a time between plane tools. One of the tools is used as a press and the other as a die. Plane tools used for the manufacture of plate parts are very heavy due to the great forces which are needed especially with an increase in the plate size, and also the manufacturing costs of such tools are high.

Previously known is also the manufacture of profiled metal plates of the heat exchangers by the rolling method, in which method continuous sheeting of the sheet material is conveyed through a pair of rolls for forming the profiled plate. A specification WO 00/53355 discloses a method for manufacturing plate parts of the heat exchanger by the rolling method. In the presented method a continuous sheeting to be worked is fed between two rolls, wherein the plate parts are shaped between two rolls with opposite surface patterns and are cut off to their final shape simultaneously when they are being shaped. In the presented device the rolls are coupled to each other with a gearing fitted at one end of the rolls and the synchronization of the rolls is arranged with roll-specific synchronization motors and an electrical control system. However, there might appear problems relating to the accuracy of the profile pattern of the plates due to the separate driving mechanisms of the rolls since the rotation speed of one of the rolls can change due to the forces appearing in the rolling and then the rotation speed of the rolls is not synchronized to each other anymore. The height of the profile pattern might also be different in the middle of the plate compared to the edges of the plate due to the bending of the rolls and this will cause by-pass flow to the plate pack to be formed and so affect to the heat exchange properties of the heat exchanger. Thus, there is still a need for a method and a device that makes possible to manufacture plate parts for heat exchangers with accurate profile pattern by the rolling method.

SUMMARY OF THE INVENTION

It is an object of the present invention to present a novel solution for manufacturing plate part blanks for a heat exchanger by the rolling method.

The object of the invention is especially to provide a method and a device for manufacturing plate part blanks, which makes possible to manufacture plate parts having more accurate profile pattern in the whole surface area of the plate.

In order to achieve among others the objects presented above, the invention is characterized by what is presented in the characterizing parts of the enclosed independent claims.

Some preferred embodiments of the invention will be described in the other claims.

The embodiments and advantages mentioned in this text relate, where applicable, both to the method, the device as well as to the arrangement according to the invention, even though it is not always specifically mentioned.

In a typical method according to the invention for manufacturing plate part blanks for a heat exchanger a sheet material in the form of continuous sheeting is worked between two rolls with opposite surface patterns to form profiled plate part blanks into the sheet material in such a way that the rolls are synchronized to rotate at substantially same rate by controlling the rotation of them in relation to each other with a common synchronization gear, which gear is coupled to the rolls by means of shafts with disk pack or gear couplings so that the backlash is less than 0.1 mm, and that two or more plate part blanks are formed into the sheet material during one revolution of the rolls.

A typical device according to the invention for manufacturing plate part blanks for a heat exchanger comprises at least
- a frame part, and
- two rolls mounted on bearings on the frame part, and which rolls comprises surface patterns opposite to each other to form profiled plate part blanks into a sheet material,
- and the device further comprises synchronization gear for controlling the rotation of the rolls in relation to each other, which gear is coupled to the rolls by means of shafts with disk pack or gear couplings so that the backlash is less than 0.1 mm, and that the rolls comprise surface patterns to form two or more plate parts during one revolution of the rolls.

A typical arrangement according to the invention comprises
- a device according to the invention for forming the plate part blanks into the sheet material, and
- a laser cutting equipment for cutting plate part blanks from the sheet material, which equipment is synchronized with the device for forming the plate part blanks.

The method according to the invention is cold working method for manufacturing profiled plate parts for the plate pack of the heat exchanger. The profiled plate parts refer to the corrugated metal plates of the heat exchanger, i.e. they have the grooves and the ridges between them. The present invention is based on one pair of the rolls of the device which rolls are synchronized and coupled to each other with a common synchronizing means without a backlash or almost without backlash, i.e. the backlash is less than 0.1 mm. Thus, the rolls are arranged to rotate at substantially same rate and thus the profiled pattern of the plates will be geometrically correct and accurate in the whole surface area of the plate. The using of the common synchronizing means according to the invention minimizes a mutual misalignment of the surface patterns of the rolls. The device of the invention includes one pair of the rolls, wherein the profiled plate parts are formed to the sheet material during the material is conveyed between the pair of the rolls.

The rolls of the device according to the invention are coupled to each other with common synchronizing means, which comprise a synchronization gear and two shafts with disk pack or gear couplings for coupling the gear with the rolls. The rotation of the rolls in relation to each other is controlled and adjusted so that they rotate at substantially same rate. The common synchronizing means eliminate the effect of the forces appearing in the rolling to the rolls, and thus the accurate profile pattern is achieved to the plate parts.

In a preferred embodiment of the invention the rolls are coupled with the synchronization gear by means of two shafts, a first shaft and a second shaft, with disk pack or gear couplings, so that one ends of the first and the second shafts are fitted in connection with one ends of the rolls and the other ends of the first and the second shafts are arranged in connection with the synchronization gear. A disk pack coupling is a zero backlash coupling which uses a disk pack made of steel as a drive element, in which two metal hubs are connected to the disk pack. A disk pack coupling can be a single disk pack or double disk pack. A gear coupling refers to double joint coupling manufactured from steel using as transmission element two crowned tooth geared hubs which engage two internal straight teeth flanges. In a preferred embodiment of the invention both of the shafts comprise two disk pack couplings. The disk pack or gear couplings are torsionally stiff, but axially and angulary flexible, to compensate shafts misalignments. The shafts with disk pack or gear couplings make possible to adjust the distance between the rolls without affecting to the synchronizing means of the rolls. Thus, the plates with different thickness and with different height of the profile pattern can also be formed by using the same rolls of the device.

In the method according to the invention, plate part blanks are shaped to the continuous sheeting of the sheet material between two rolls; a first roll and a second roll which rolls comprising opposite surface patterns to form profiled plate part blank or blanks into the sheet material. Two or more plate part blanks are formed into the sheet material during one revolution of the rolls, i.e. the plate part blanks are formed to the continuous sheeting when it has travelled through a pair of rolls. In a preferred embodiment of the invention two plate part blanks are formed during one revolution of the rolls, which plate part blanks have a same size, i.e. the rolls comprises two similar surface patterns arranged to the opposite sides of the roll. One revolution of the rolls refers to a complete revolution of the rolls, wherein the whole length of the rolls' circumference has had in contact with the sheet material. The number of the plate part blanks to be formed during one revolution is dependent on the size of the plate parts to be manufactured. The size of the plate part blanks to be formed can be different. It is advantageous to extend the area to be profiled over the whole width of the sheet material and so the amount of the formed plate parts during one rotation is dependent on the size of the plate parts to be profiled. The smaller plate parts can be formed to the areas of the sheet material which left out from the plate parts having larger size. The substantially unbending rolls of the device are achieved by this arrangement since the rolling forces can be divided evenly. The bending of the rolls is at most 0.02 mm in relation to the central axis of the rolls, when two plate part blanks are formed during one revolution of the rolls, and thus the height of the profile pattern is substantially equal in the whole surface area of the plates to be formed.

The method and the arrangement according to the invention makes possible to manufacture plate parts in different shapes, i.e. rectangular or circular plate parts, or in different sizes, i.e. for example the diameter of the circular plate parts can vary. Typically, the diameter of the circular plate parts is from 150 to 1500 mm. The plate parts can also comprise small openings therein.

The surface patterns, or so-called profiling patterns, having opposite shapes on the surfaces of the rolls are either fixed to the surfaces of the rolls in a stationary manner, or detachable, locked onto the surfaces of the rolls in a stationary manner. The profiling pattern refers to the corrugation of the plate part, i.e. the grooves and the ridges between them. In a preferred embodiment of the invention the rolls comprise surface patterns to form two or more plate parts during one revolution of the rolls.

In an embodiment of the invention, the rolls comprise surface patterns which form a continuous profile pattern to the sheet material, i.e. continuous rectangular profile pattern. Rectangular plate part blanks with a desired length can be cut off from the sheet material with continuous profile pattern.

According to a preferred embodiment of the invention the synchronization gear is equipped with a driving mechanism, such as an electrical motor, which driving mechanism is mutual to both of the rolls. Thus the speed of the rolls can be adjusted in stepless manner.

A rotating speed of the rolls can be adjusted on the basis of the material properties and the thickness of the sheet material used as a raw material.

The method and device for manufacturing plate parts according to the invention are used in the following way. The distance of the rolls is adjusted to correspond the thickness of the sheet material used as the raw material. The plate part blanks are shaped between two rolls with opposite shapes, i.e. profiling patterns, for forming profiled plate part blanks and then the blanks are cut off from the sheet material to the final shape of the plates in a separate cutting stage. In a preferred embodiment of the invention the plate part blanks are cut by using a laser cutting device. Typically the sheet material in the form of continuous sheeting comprising profiled plate part blanks is conveyed to the laser cutting equipment directly from the rolling device. The function of the laser cutting equipment is synchronized with the rotation speed of the rolls.

The plate part blanks can also be cut off from the sheet material by using any other suitable cutting method.

In an embodiment of the invention the plate part blanks are photographed before the laser cutting stage and the position of the plate parts to be cut is determined on the basis of the photographs, i.e. an alignment of the laser cutting equipment is determined and adjusted on the basis of the photographs. According to an embodiment of the invention, the sheet material also comprises separate checking patterns formed by the rolls and on the basis of these checking patterns the laser cutting device can determine the location of the plate blanks to be cut. In a preferred embodiment of the invention camera is arranged to photograph two checking patterns which are arranged on both side of the plate part blank to be cut and to compare these checking patterns to the reference image and then to adjust alignment of the laser cutting device. In an embodiment of the invention the laser cutting device is arranged to cut off the plate part blanks from the sheet material and also simultaneously to cut openings to the plate part, if needed.

An arrangement according to an embodiment of the invention also comprises an instrument for measuring a depth of the profile pattern of the formed plate parts. In a preferred embodiment of the invention the depth of the profile pattern is measured automatically with a laser sensor. The depth of the profile pattern can be easily checked in one, two or more points of the plate part. The measurement can be carried out before or after the laser cutting equipment. If the depth of the profile pattern is incorrect, the rolls of the device can be stopped automatically.

A device and an arrangement according to the invention also comprise required devices for unwinding the sheet material, which is e.g. on the reel, and roller tracks for purpose of feeding the sheet material to the device and forward to the cutting equipment.

The sheet material is typically steel, such as stainless steel or other suitable material for the plates of the heat exchanger. The thickness of the sheet material is typically from 0.5 to 1.5 mm.

The method and device for manufacturing plate parts according to the invention has considerable advantages to methods and devices presently in use. Particularly in the manufacture of larger plate parts, the pressing force required by the rolling is substantially reduced when compared with planar working tools. This smaller need for force is based on the fact that the contact surface between the rolls and the sheet material is, in principle, a line, wherein the area to be worked is small.

The method and device for manufacturing plate parts according to the invention considerably reduce the manufacturing costs of larger plate parts with low profiles. In addition, the quality of the plate parts to be manufactured is improved.

DESCRIPTION OF THE DRAWINGS

The invention will be described in more detail with reference to appended drawings, in which.

DETAILED DESCRIPTION OF THE INVENTION

Figure 1:
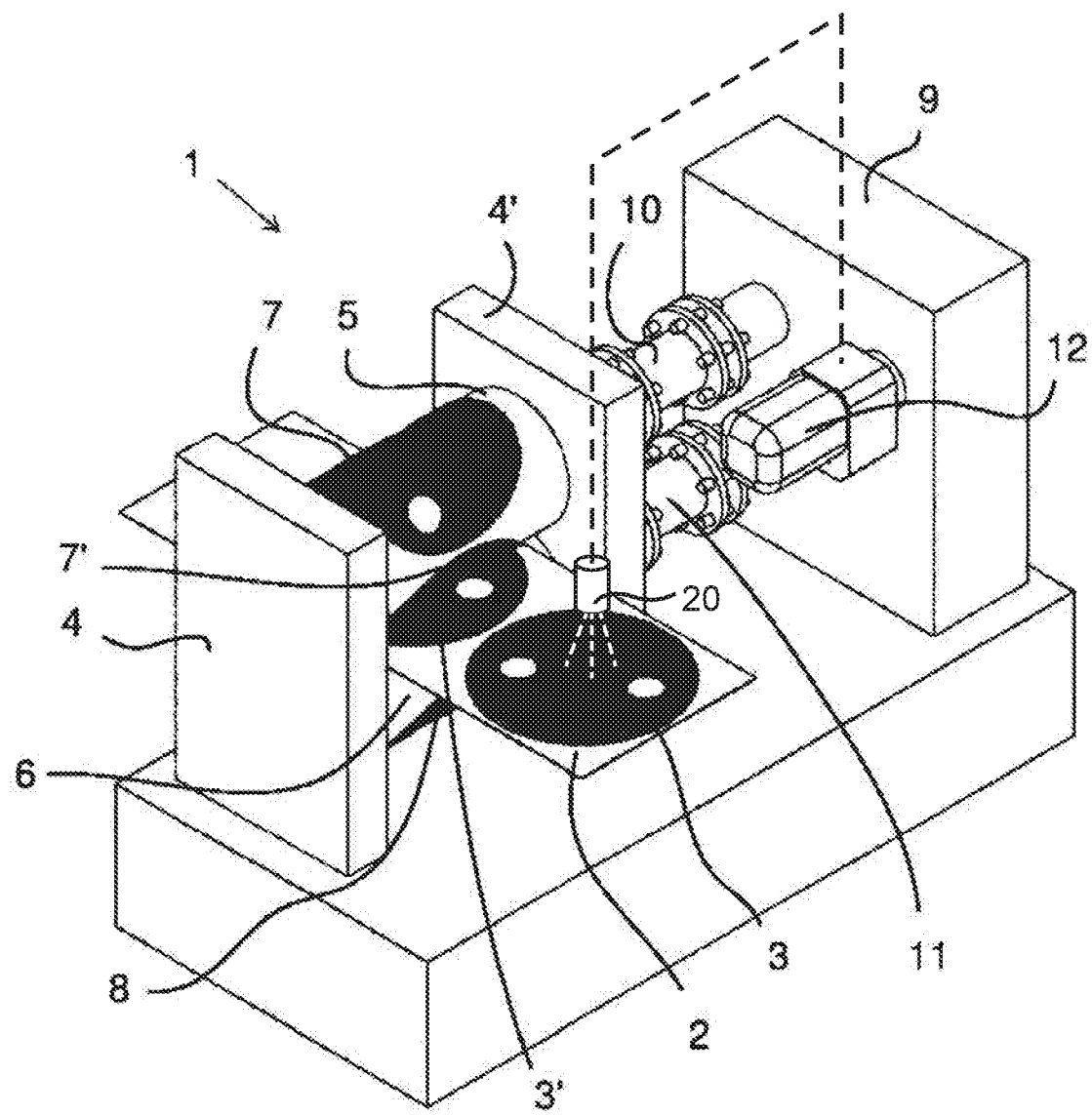
FIG. 1 shows the device according to an embodiment of the invention for manufacturing plate part blanks.

In the method according to the invention, the plate part blanks for a heat exchanger can be manufactured with a device of FIG. 1. The device 1 according to an embodiment of the invention comprises a frame part 4, 4' and two rolls 5, 6 mounted on bearings on the frame part 4, 4'. The rolls 5, 6 comprise profiling patterns 7, 7', 8 opposite to each other to form profiled plate part blanks 3, 3' into a sheet material 2. The sheet material is conveyed through the rolls 5, 6 in the form of continuous sheeting as illustrated in FIG. 1 and the plate part blanks 3, 3' are shaped of the sheet material 2 between the rolls. According to the invention as illustrated in FIG. 1, two plate part blanks 3, 3' are formed into the sheet material 2 during one revolution of the rolls 5, 6. The profiling patterns 7, 7', 8 are typically fixed to the surfaces of the rolls 5, 6 in a stationary manner.

The rolls 5, 6 of the device 1 presented in FIG. 1 are synchronized to each other with common synchronization gear 9 so that the gear 9 are coupled to the rolls by means of two shafts 10, 11 with disk pack or gear couplings. One end of the shafts 10, 11 is connected to the rolls 5, 6 and other end of the shafts 10, 11 is connected to the synchronization gear 9. The synchronization gear is equipped with a driving mechanism 12, such as an electrical motor.

Figure 2:
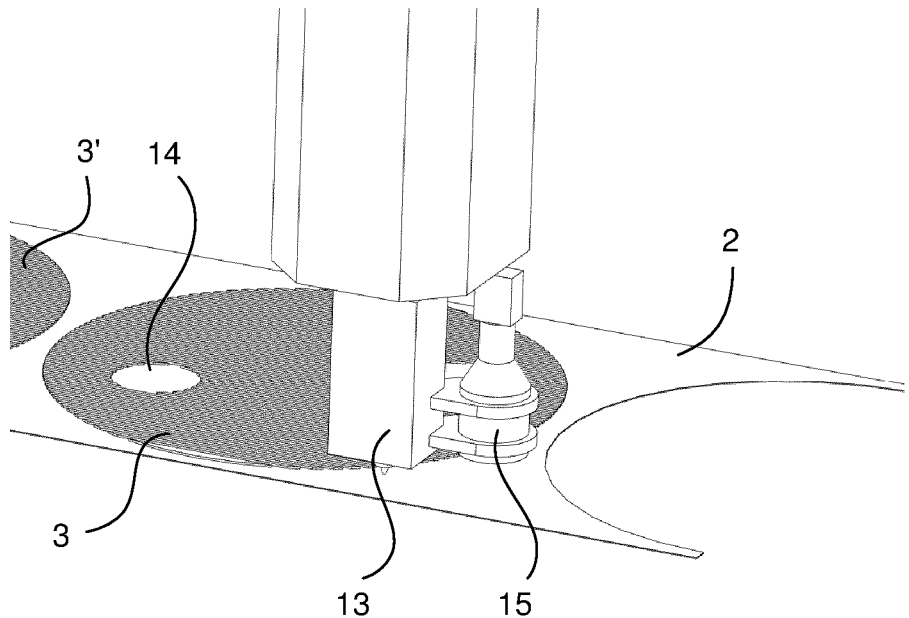
FIG. 2 shows a laser equipment according to an embodiment of the invention.

In the method according to an embodiment of the invention, the plate part blanks 3, 3' are cut off from the sheet material 2, and also the openings 14 of the plate parts are cut off simultaneously by using laser cutting equipment 13, as shown in FIG. 2. The laser cutting equipment 13 comprises camera 15 for determining the location of the plate part to be cut.

Figure 3:
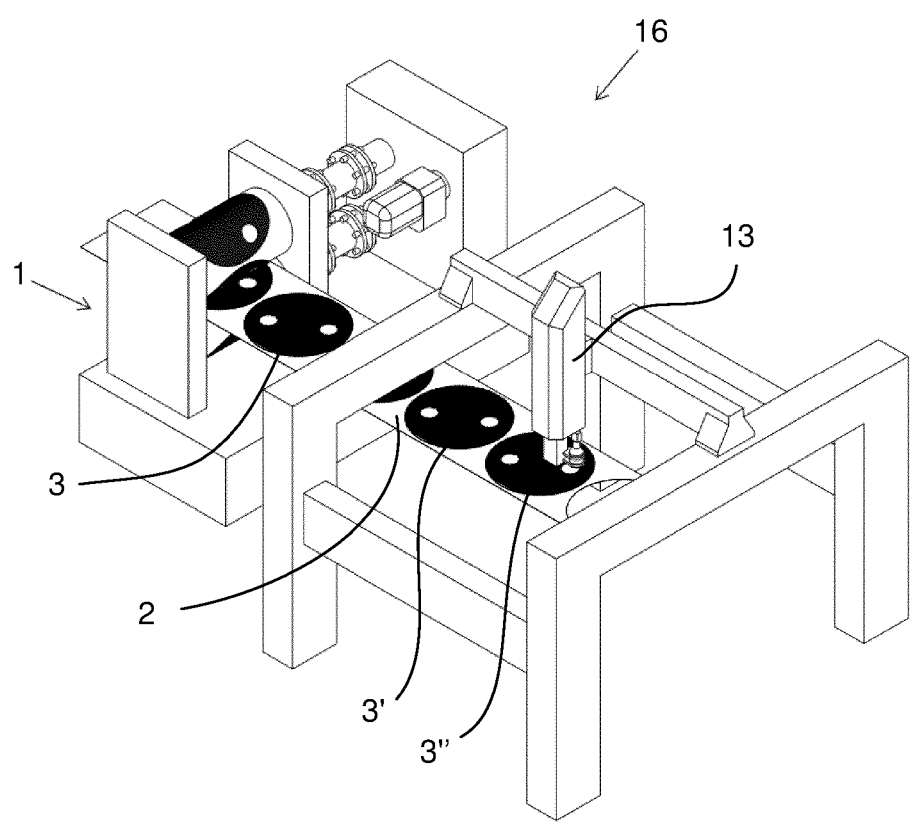
FIG. 3 shows an arrangement according to an embodiment of the invention for manufacturing plate parts for a heat exchanger.

FIG. 3 shows an arrangement 16 according to an embodiment of the invention for manufacturing plate parts for a heat exchanger, which arrangement comprises a device 1 for manufacturing plate part blanks 3, 3', 3" into the sheet material and laser cutting equipment 13 arranged to the same production line with the device 1 wherein the function of the laser cutting equipment 13 is synchronized with the rotation speed of the rolls 5, 6 of the device 1.

As noted briefly above, one arrangement of the device 1 according to an embodiment of the invention comprises an instrument for measuring a depth of the profile pattern of the formed plate parts. In a preferred form, the instrument is a laser sensor 20 as shown in FIG. 1 so as to measure automatically the depth of the profile patterns formed on the plate part blanks 3, 3'. The depth of the profile patterns can be easily checked in one, two or more points of the plate part blanks 3, 3'. The profile depth measurement can be carried out before laser cutting as shown in FIG. 1. Alternatively, the profile depth measurement can be carried out after the laser cutting equipment 13 in which case the laser sensor 20 may be provided as an additional component to the camera 15. If the laser sensor 20 senses that the depth of the profile pattern is incorrect, a signal may automatically be sent to stop the driving mechanism 12 which in turn stops both the rolls 5, 6 of the device 1 via the synchronization gear 9.

Many variations of the present invention will suggest themselves to those skilled in the art in light of the above detailed description. Such obvious variations are within the full intended scope of the appended claims.

The invention claimed is:

1. A method for manufacturing corrugated plate part blanks of
a heat exchanger, wherein the method comprises:
   (a) working sheet material in the form of continuous sheeting having opposed surfaces between two rolls having opposingly similar profile patterns thereon to be impressed onto respective ones of the opposed sheet material surfaces;
   (b) controlling rotation of the rolls in relation to each other so as to achieve a synchronized rotation of the rolls to cause the rolls to rotate at substantially a same rate by coupling a common synchronization gear to the rolls by shafts with a disk pack or gear couplings to limit backlash of the rolls to less than 0.1 mm;
   (c) impressing correspondingly aligned surface patterns to a predetermined depth onto the respective ones of the opposed sheet material surfaces by the opposingly similar profile patterns and the synchronized rotation of the rolls;
   (d) arranging corrugated plate part blanks with similar surface patterns on opposite sides of the rolls and forming at least one pair of the corrugated plate part blanks of the heat exchanger into the sheet material during one revolution of the rolls;
   (e) further forming checking patterns into the sheet material on both sides of the corrugated plate part blanks;
   (f) photographing the checking patterns on the sheet material surfaces to determine positioning of the corrugated plate part blanks on the sheet material surfaces and providing alignment information of the corrugated plate part blanks;

(g) conveying the sheet material with the at least one pair of corrugated plate part blanks to a laser cutting device and controlling the laser cutting device based on the alignment information so as to cut the plate blank parts from the sheet material while synchronizing the laser cutting device with the rotation speed of the rolls; and (h) measuring depth of the surface patterns of the corrugated plate part blanks impressed onto the respective ones of the opposed sheet material surfaces, and automatically stopping rotation of the rolls in relation to one another if the measured depth of the profile patterns deviates from the predetermined depth.

2. The method according to claim 1, wherein that the profile patterns of the rolls extend over an entire width of the sheet material.

3. The method according to claim 1, wherein the sheet material has a thickness from 0.5 to 1.5 mm.

4. The method according to claim 1, wherein step (h) is practiced by measuring the depth of the surface patterns with a laser sensor.

5. The method according to claim 4, wherein step (h) is practiced by measuring the depth of the profile pattern in two or more locations of the plate part.

6. The method according to claim 4, wherein step (h) is practiced before or after step (g).

7. The method according to claim 1, which further comprises the step of:

(i) adjusting separation distance between the rolls without affecting the synchronized rotation of the rolls.

* * * * *